(12) United States Patent
Kingsolver et al.

(10) Patent No.: US 7,333,806 B2
(45) Date of Patent: Feb. 19, 2008

(54) SYSTEM AND METHOD FOR ENABLING TWO-WAY RADIO COMMUNICATIONS OVER A COMPUTER NETWORK

(75) Inventors: David Kingsolver, Kansas City, MO (US); Thomas Feurt, Cameron, MO (US)

(73) Assignee: Midland Radio Corporation, Kansas City, MO (US)

( * ) Notice: Subject to any disclaimer, the term of this patent is extended or adjusted under 35 U.S.C. 154(b) by 131 days.

(21) Appl. No.: 10/625,249

(22) Filed: Jul. 23, 2003

(65) Prior Publication Data

US 2005/0020255 A1    Jan. 27, 2005

(51) Int. Cl.
*H04Q 7/20* (2006.01)
(52) U.S. Cl. ................ 455/426.1; 455/403; 455/550.1
(58) Field of Classification Search ................ 455/466, 455/426.1, 414.4, 414.1, 414.3, 517, 454, 455/422.1, 566, 403, 550.1, 445; 709/219, 709/218, 217
See application file for complete search history.

(56) References Cited

U.S. PATENT DOCUMENTS

| | | | |
|---|---|---|---|
| 6,138,158 A * | 10/2000 | Boyle et al. | 709/219 |
| 6,247,048 B1 * | 6/2001 | Greer et al. | 709/219 |
| 6,263,437 B1 * | 7/2001 | Liao et al. | 713/169 |
| 6,275,575 B1 * | 8/2001 | Wu | 455/518 |
| 6,539,077 B1 | 3/2003 | Ranalli et al. | |
| 2004/0204097 A1 * | 10/2004 | Scheinert et al. | 455/466 |

OTHER PUBLICATIONS

V.34 Modem, VOCAL Technologies Ltd. © 2000 (document No. "V.34 Modem-0004A").*
PCT International Preliminary Report on Patentability, no date listed.
PCT International Search Report, no date listed.

* cited by examiner

*Primary Examiner*—Jean Gelin
(74) *Attorney, Agent, or Firm*—Alan Clement

(57) ABSTRACT

The present invention discloses novel systems and methods for enabling two-way radio communications over a computer network including correlating signals received by a two-way radio networking base/repeater station from a two-way radio to an internet or Internet Protocol address of one or more other base/repeater stations and establishing a computer network link for two-way radio networking communications over a computer network such as the Internet.

19 Claims, 1 Drawing Sheet

SYSTEM AND METHOD FOR ENABLING TWO-WAY RADIO COMMUNICATIONS OVER A COMPUTER NETWORK

FIELD OF THE INVENTION

The present invention relates to a system and method for enabling two-way radio communications over a computer network. More particularly, the invention relates to a system and method for correlating signals received by a two-way radio networking ("TWRN") base/repeater station from a remote two-way radio to an internet or Internet Protocol ("IP") address of one or more other base/repeater stations and establishing a computer network link for TWRN communications over a computer network such as the Internet.

BACKGROUND OF THE INVENTION

TWRN is a well-known communications method. TWRN often may involve a first end-user with a remote two-way radio that sends and receives communications using radio signaling such as DTMF, DCS, CTCSS, 5/6 tone selcall, or other type of modulated RF control format with a first base/repeater station. The first base/repeater station transmits the voice or data communication signals to at least one second base/repeater station. The second base/repeater station then transfers the communication signals to a second end user in contact with the second base/repeater station and the process is reversed for return communications. Conventional TWRN communication generally is controlled by each portable/mobile unit having a unique ID and/or group ID. This ID is stored at the audio switch controller of the base/repeater station that this user is within range of. When a call is made to the individual user, a search is made of the controllers until the ID is found. The controllers then route audio as appropriate. In conventional TWRN, long-range communications are exchanged between and among the base/repeater stations via audio switching networks or dedicated telephone lines. Such networks require a costly infrastructure.

Computer networks, such as the Internet, have more recently become well known and pervasive. Unlike the circuit switched technology of TWRN, these networks utilize a packet switched technology. Compared to circuit switched networks, packet switched networks are commonly acknowledged to be far more efficient for the transport of information. Generally, charges for use of switch networks and dedicated telephone lines are time based (i.e., cents per minute of use) whereas charges for use of the computer networks are usually flat monthly fees. Computer networks and the Internet utilize an addressing structure completely different from the TWRN. They employ unique domain names (e.g., "abc.com") and associated, unique addresses (e.g., "123.255.255.123") for establishing packet-based communications between systems. Even though the system of the present invention is not required to use the PSTN or TWRN, the design of the system of the present invention optionally may include expedients enabling use of such systems.

In general, communication via computer networks, as compared with other communications, results in a lower cost to the end user. Accordingly, individuals and businesses often seek to shift communications traffic from the TWRN and other systems, such as the Public Switched Telephone Network ("PSTN"), to the Internet.

Ranalli et al., U.S. Pat. No. 6,539,077, describes one example of a method and apparatus designed to shift communications from the PSTN to the Internet. Ranalli et al. describes a database on a data network to relate a unique identifier attached to a user to a data network address including an IP by which the user may be reached. Ranalli et al. provide a method is provided for registering a telephone number and an associated IP with a directory service that is accessible on the Internet. The directory service can then be accessed with a request for resolution of the unique identifier to its associated Internet address, wherein the directory service resolves the associated Internet address in response to the request. Ranalli et al. do not mention or suggest, in any way, application of such a system to two-way radio communications.

Thus, no prior art teaches or suggests a method or system for enabling two-way radio communications over a computer network and/or the Internet.

SUMMARY OF INVENTION

The present invention concerns TWRN using a computer network or Internet real-time voice or data communication system. In one preferred embodiment, the user of a remote two-way radio wishing to communicate voice or data to another user selects and transmits a unique signal code associated with a desired target base/repeater station with which the remote is not in communication. A first base/repeater station with which the first remote radio is in communication receives the signal code. Hardware and software at the base/repeater station correlates the code with an internet or IP address of one or more target base/repeater stations, establishes a computer network link between or among the base/repeater stations via a computer network and/or Internet real-time voice communication system and bi-directionally translates two-way radio signals into a digital format. Thus, a voice/data communication path is established between or among base/repeater stations such that two-way radio communications may be exchanged across great distances. The current application of the present invention provides bi-directional service. Uni-directional service is inherent in the invention if such use is desired.

Thus, it is an object of the present invention to provide a system and method that allows for the exchange of two-way radio signals across great distances by making use of computer networks.

It is a further object of the present invention to provide a system and method that allows for two-way radio communication that is less expensive than conventional TWRN communication using audio switching networks or dedicated telephone lines.

DETAILED DESCRIPTION OF THE INVENTION

Figure 1:
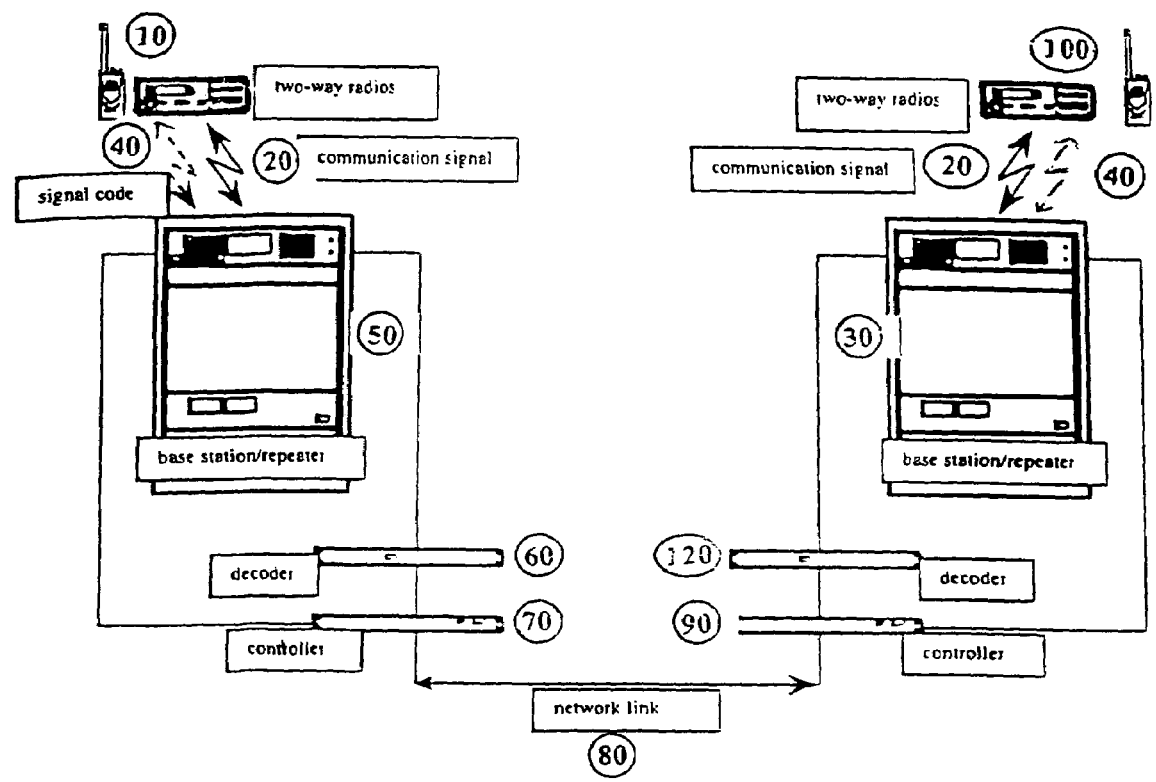
FIG. 1 is a flow diagram of the sequence of events that occur in the operation of one embodiment of the present invention.

The present invention concerns two-way radio communications using a computer network and/or Internet real-time voice communication system. FIG. 1 is a flow diagram of the sequence of events that occur in the operation of one embodiment of the present invention. The user of a first two-way radio 10 wishing to communicate with one or more target base/repeater station(s) 30 in which the first two-way radio 10 is not in communication selects and transmits a signal code 40 associated with the desired target base/repeater station(s) 30. The user of a first radio 10 may select the signal code 40 using a selection means (not shown). The selection means may be a keypad or channel selector device. However, any selection means known to those skilled in the art may be used. Such means are well known to those skilled in the art. The signal code 40 is transmitted to a base/repeater station 50 with which the first radio 10 is in communication via a transmitting means (not shown). The transmitting means may be modulated RF carrier. However, any suitable transmitting means known to those skilled in the art may be used.

The user of the first radio 10 also transmits voice/data communication via communication signals 20 to the base/repeater station 50 using a sending/receiving means. The transmitting means and the sending/receiving means may be one in the same; however, such need not be the case. In other instances, the sending/receiving means may be modulated lightwave, or wireline. Information in the communication signals 20 is generally, but not limited to, human voice, control signals, and status messages.

The first radio 10 can use as a signal code 40 any type of signal desired by the user that is compatible with the base/repeater station 50 with which the first radio 10 is in communication. The communication signals 20 likewise can use any type of signal desired by the user that is compatible with the base/repeater station 50 with which the first radio 10 is in communication. The communication signals 20 and signal code 40 can be in the form of a communication protocol such as conventional (non-trunked), LTR, MPT-1327, EDACS, or other such protocols, or any combination thereof, or any suitable protocol known to those skilled in the art. Also any excitable signaling method, such as DCS, CTCSS, DTMF, any type of tone control format, any combination thereof, or any suitable methods known to those skilled in the art may be used for the signal code 40 and/or communication signals 20.

In the depicted embodiment, a lead decoder 60 at the base/repeater station 50 receives the signal code 40 and the communication signals 20 from the first radio 10 via a sending/receiving means (not shown). The lead decoder 60 then decodes the signal code 40 from the first radio 10 into a format that can be recognized by a lead controller 70 and transfers the decoded signal to the lead controller 70. The lead decoder may be computer based, repeater controller based, or a dedicated stand-alone decoder. However, any lead decoder technology known to those skilled in the art may be used.

In the depicted embodiment, the lead controller 70 assimilates the decoded signal for the first base/repeater station 50 via an assimilating means (not shown). The assimilating means may be computer based. However, any assimilating means known to those skilled in the art may be used. The lead controller 70 also analyzes the data for validity and correctness in protocol via a verifying means (not shown). The verifying means may be a computer database. However, any suitable verifying means known to those skilled in the art may be used.

The lead controller 70 additionally employs a correlation means to correlate the signal to an internet or IP address. Preferably, the correlation is accomplished by a computer relational database. However, correlation may be accomplished by any suitable means known to those skilled in the art. In the depicted embodiment, lead controller 70 performs the correlation that determines the type of signaling used and the specific response to act upon via a determination means (not shown). The determination means may be computer based. However, any suitable determination means known to those skilled in the art may be used. Once the lead controller 70 has determined the signaling method, the information may be used for either: (i) directly selecting an IP target or (ii) referencing a location in a database directory containing destination IP addresses and parameters pertaining to communication functionality. A targeting means may be used for selecting an IP target. The targeting means preferably is a computer based relational database. However, any suitable targeting means known to those skilled in the art may be used. A directory means is used for referencing a location in a database directory. The directory means may be a relational database. However, any suitable directory means known to those skilled in the art may be used. The data base directory may comprise IP or Internet addresses as they relate to signaling and specific base/repeater stations.

The selected desired IP address or the direct IP method is then utilized by the lead controller 70 to establish by a linking means a bi-directional computer network link 80 via a computer network or Internet voice or data communication system between the lead controller 70 and one or more target base/repeater stations 30. The linking means may be computer networks. However, any suitable linking means known to those skilled in the art may be employed. Using a conversion means, the base/repeater station 50 bi-directionally converts two-way radio communication signals 20 into a digital format. The conversion means may be by computer based CODEC (analog to VoIP). However, any suitable conversion means know to those skilled in the art may be used.

Once a bi-directional link is established between the base/repeater station and the target base/repeater station(s), digitalized communication signals 20 can be exchanged over the computer network link 90. The link may remain active until any user desires to break the link. This event will cause the link to become disconnected. Normal operation is that only the link originated by the caller will be terminated and returned to stand-by. Operation where all links are terminated and set to stand-by is also possible in accordance with the practice of the present invention.

In the depicted embodiment, a controller 90 at the target base/repeater station(s) 30 receives the communication signals 20 from the computer network link 90 and bi-directionally converts them via a conversion means (not shown) into signals that can be transmitted by the target base/repeater station 30. The conversion means may be a computer based CODEC. However, any means known to those skilled in the art may be used. The communication signals sent by the target base/repeater station 30 can be received by any second two-way radio 100 that is in communication with the target base/repeater station 30. Since the computer network link 80 is bi-directional, a path for the exchange of communications has been established between the first radio 10 and any second radio 100. This methodology can implement two-way radio communications that are not limited by the range of the two-way radios.

A target base/repeater station 30 could also initiate the operation explained above since a decoder 120 and controller 90 may be installed at a target base/repeater station 30. As heretofore noted, the described operation is also possible between multiple base/repeater stations and is not limited to communications between two points. Further, Even though this system may not use the PSTN or TWRN in its current implementation the design does not preclude use of these systems.

The above-mentioned patents are incorporated herein by reference. Many variations of the present invention will suggest themselves to these skilled in the art in light of the above-detailed description. All such obvious variations are within the full-intended scope of the appended claims.

What is claimed is:

1. A system for two-way radio communication comprising:
   (a) a first two-way radio comprising:
      (i) a means for selecting and transmitting a signal code to a shared, public base/repeater station; and
      (ii) a means for sending two-way radio communication signals to said shared, public base/repeater station;
      (iii) a means for receiving two-way radio communication signals from said shared, public base/repeater station;
   (b) said shared, public base/repeater station comprising:
      (i) a base/repeater station decoder at said shared, public base/repeater station for decoding the signal code from said first two-way radio into a signal that is recognized by a base/repeater station controller located at said shared, public base/repeater station and transferring said signal to said base/repeater station controller via a dedicated connection; and
      (ii) wherein said base/repeater station controller comprises a means for receiving said decoded signal from said base/repeater station decoder and correlating said decoded signal to one or more internet addresses associated with at least one target base station by which there is established a bi-directional computer network link with said at least one target base station using said internet address for the exchange of two-way radio communication signals;
      (iii) wherein said shared, public base/repeater station further comprises a means for sending and receiving two-way radio communications signals to and from said first two-way radio; and
   (c) wherein said at least one said target base station comprises:
      (i) a target station controller located at said target base station comprising a means for establishing a bi-directional computer network link with said shared, public base/repeater station for two-way radio communication signals;
      (ii) wherein said at least one target base station further comprises a means for sending and receiving two-way radio communication signals to and from a second two-way radio; and
   (d) at least one second two-way radio comprising:
      (i) a means for receiving two-way radio communication signals from said at least one target base station; and
      (ii) a means for sending two-way radio communication signals to said at least one target base station; and
   (e) whereby two-way radio communication signals are bi-directionally exchanged directly between said first two-way radio and said second two-way radio via said bi-directional computer network link directly between said shared, public base/repeater station controller and said target station controller.

2. A system as defined in claim 1 wherein said means for selecting a signal code to said shared, public base/repeater station is a keypad device.

3. A system as defined in claim 1 wherein said means for selecting a signal code to said shared, public base/repeater station is a channel selector device.

4. A system as defined in claim 1 wherein said signal code is selected from the group consisting of the following signaling methods: DCS (Digitally Code Squelch), CTCSS (Continuous Tone Coded Squelch), DTMF (Dual-Tone Multi-Frequency) or any combination thereof.

5. A system as defined in claim 1 wherein said signaling method comprises a modulated RF carrier.

6. A system as defined in claim 1 wherein said signal code is selected from the group consisting of the following communication protocols: LTR (Logic Trunked Radio), MPT-1327 (Ministry of Post and Telecommunications-1327), EDACS (Enhanced Digital Access Control System), conventional (non-trunked) or any combination thereof.

7. A system as defined in claim 1 wherein said shared, public base/repeater station means for correlating the signal to one or more internet addresses associated with a target station is a computer based radio controller that contains a relational data base.

8. A system as defined in claim 1 wherein the Internet address is an IP address.

9. A system as defined in claim 1 wherein said means for establishing a bi-directional computer network link between said at least one target base station and said shared, public base/repeater station is a voice communication system selected from a group consisting of conventional, trunked radio systems or combinations thereof.

10. A system as defined in claim 1 wherein said at least one target base station further comprises a target station decoder for decoding a signal code from said second two-way radio into a signal that can be recognized by a base/repeater station controller and for transferring said signal to said base/repeater station controller; and wherein said target station controller further comprises a means for receiving a decoded signal from said target station decoder and correlating said decoded signal into one or more internet addresses associated with one or more shared, public base/repeater stations and a means for establishing a bi-directional computer network link with said at least one shared, public base/repeater station for the exchange of communication signals using said internet address; and wherein said at least one second two-way radio is further comprised of a means for selecting and transmitting a signal code to said at least one target base station.

11. A method for exchanging two-way radio communication signals between two-way radios via a bi-directional computer network link directly between a shared, public base/repeater station and at least one target base station, said method comprising:
   (a) transmitting a signal code and two-way radio communication signals from a two-way radio to said shared, public base/repeater station having a controller located at said shared, public base/repeater station;
   (b) decoding said signal code and correlating said decoded signal code at said shared, public base/repeater station location to one or more internet addresses and establishing a bi-directional computer network link with said at least one target base station using said internet address to exchange two-way radio communication signals;
   (c) establishing a bi-directional computer network link directly between said shared, public base/repeater station and said at least one target base station having a controller at said at least one target base station through said internet address;
   (d) transmitting two-way radio communication signals over said computer network link directly to said at least one target base station;
   (e) transmitting said two-way radio communication signals from said at least one target base station to a second two-way radio; (f) transmitting two-way radio communication signals from said second two-way radio to said at least one target base station;

(g) transmitting two-way radio communication signals from said at least one target base station over said computer network link directly to said shared, public base/repeater station; and (h) transmitting two-way radio communication signals from said shared, public base/repeater station to said first two-way radio.

12. A method as defined in claim 11 wherein said signal code is selected on a keypad device.

13. A method as defined in claim 11 wherein said signal code is selected on a channel selector device.

14. A method as defined in claim 11 wherein said signal code is selected from the group consisting of the following signaling methods: DCS (Digitally Code Squelch), CTCSS (Continuous Tone Coded Squelch), DTMF (Dual-Tone Multi-Frequency) or any combination thereof.

15. A method as defined in claim 11 wherein said signal code is selected from the group consisting of the following communication protocols: LTR (Logic Trunked Radio), MPT-1327 (Ministry of Post and Telecommunications-1327), EDACS (Enhanced Digital Access Control System), or any combination thereof.

16. A method as defined in claim 11 wherein said signal code is correlated to one or more internet addresses associated with said at least one target base station by a radio controller using a computer based relational data base and a suitable decoder.

17. A method as defined in claim 11 wherein the Internet address is an IP address.

18. A method as defined in claim 11 wherein said bi-directional computer network link between said at least one target base station and said shared, public base/repeater station is established by a voice communication system selected from the group consisting of trunked, conventional radio systems or a combination thereof.

19. A system for two-way radio communication outside of a cellular network comprising:
  (a) a first two-way radio comprising:
    (i) a means for selecting and transmitting a signal code to a shared, public base/repeater station; and
    (ii) a means for sending two-way radio communication signals to said shared, public base/repeater station;
    (iii) a means for receiving two-way radio communication signals from said shared, public base/repeater station;
  (b) said shared, public base/repeater station comprising:
    (i) a base/repeater station decoder at said shared, public base/repeater station for decoding the signal code from said first two-way radio into a signal that is recognized by a base/repeater station controller located at said shared, public base/repeater station and transferring said signal to said base/repeater station controller via a dedicated connection; and
    (ii) wherein said base/repeater station controller comprises a means for receiving said decoded signal from said base/repeater station decoder and correlating said decoded signal to one or more internet addresses associated with at least one target base station by which there is established a bi-directional computer network link with said at least one target base station using said internet address for the exchange of two-way radio communication signals;
    (iii) wherein said shared, public base/repeater station further comprises a means for sending and receiving two-way radio communications signals to and from said first two-way radio; and
  (c) wherein said at least one said target base station comprises:
    (i) a target station controller located at said target base station comprising a means for establishing a bi-directional computer network link with said shared, public base/repeater station for two-way radio communication signals;
    (ii) wherein said at least one target base station further comprises a means for sending and receiving two-way radio communication signals to and from a second two-way radio; and
  (d) at least one second two-way radio comprising:
    (i) a means for receiving two-way radio communication signals from said at least one target base station; and
    (ii) a means for sending two-way radio communication signals to said at least one target base station; and
  (e) whereby two-way radio communication signals are bi-directionally exchanged directly between said first two-way radio and said second two-way radio via said bi-directional computer network link directly between said base/repeater station controller and said target station controller.

* * * * *